United States Patent
Davis et al.

(10) Patent No.: US 6,615,233 B1
(45) Date of Patent: Sep. 2, 2003

(54) APPARATUS AND METHOD FOR TRANSMITTING DOCUMENTS BETWEEN A SERVER COMPUTER AND A CLIENT COMPUTER

(75) Inventors: Christopher Davis, Huntsville, AL (US); Marcelo Vinante, Madison, AL (US)

(73) Assignee: Intergraph Hardware Technologies Company, Las Vegas, NV (US)

(*) Notice: Subject to any disclaimer, the term of this patent is extended or adjusted under 35 U.S.C. 154(b) by 0 days.

(21) Appl. No.: 09/249,403

(22) Filed: Feb. 12, 1999

Related U.S. Application Data

(60) Provisional application No. 60/074,920, filed on Feb. 17, 1998.

(51) Int. Cl.⁷ .............................................. G06F 15/16
(52) U.S. Cl. ........................................ 709/203; 709/245
(58) Field of Search .............................. 709/200, 232, 709/245, 203, 223, 224, 227, 217–219, 247; 707/10, 1, 6, 103; 705/26

(56) References Cited

U.S. PATENT DOCUMENTS

| | | | | |
|---|---|---|---|---|
| 5,187,790 A | * | 2/1993 | East et al. ................... | 709/316 |
| 5,619,690 A | * | 4/1997 | Matsumani et al. ......... | 707/200 |
| 5,754,782 A | * | 5/1998 | Masada ....................... | 709/213 |
| 5,802,299 A | * | 9/1998 | Logan et al. ................ | 709/218 |
| 5,887,133 A | * | 3/1999 | Brown et al. ................ | 709/200 |
| 5,966,702 A | * | 10/1999 | Fresko et al. .................. | 707/1 |
| 6,038,601 A | * | 3/2000 | Lambert et al. ............ | 709/226 |
| 6,038,610 A | * | 3/2000 | Belfiore et al. ............. | 709/300 |
| 6,041,360 A | * | 3/2000 | Himmel et al. ............. | 709/245 |
| 6,047,327 A | * | 4/2000 | Tso et al. .................... | 709/232 |
| 6,094,657 A | * | 7/2000 | Hailpern et al. ............ | 707/103 |
| 6,094,677 A | * | 7/2000 | Capek et al. ................ | 709/219 |
| 6,098,093 A | * | 8/2000 | Bayeh et al. ................ | 709/203 |
| 6,151,624 A | * | 11/2000 | Teare et al. .................. | 709/217 |
| 6,161,145 A | * | 12/2000 | Bainbridghe et al. ....... | 709/246 |
| 6,223,178 B1 | * | 4/2001 | Himmel et al. ............... | 707/10 |
| 6,226,691 B1 | * | 5/2001 | Cantin et al. ............... | 709/316 |
| 6,256,627 B1 | * | 7/2001 | Beattie et al. .................. | 707/6 |
| 6,463,064 B1 | * | 10/2002 | Broockman et al. ........ | 370/401 |

FOREIGN PATENT DOCUMENTS

EP  0 820 024 A2  1/1998

OTHER PUBLICATIONS

Structure of HTML 4.0; www.w3.org/TR/WD–html40–970708/.*
Meta Tags: Their Uses and Fuctions; www.globalserve.net.*
Nicol D., et al., "Footsteps: Trail–blazing the Web," Computer Networks and ISDN Systems, vol. 27, No. 6, Apr. 1, 1995, pp. 879–885.
D. Fiedler & S. Clark, "Using META Tags for identification control of pages," Dec. 3, 1997, pp. 1–2, XP002106194.
D. Flanagan, "JavaScript: The Definitive Guide, 2ⁿᵈ Edition," 1997, O'Reilly & Associates, USA, XP002106195, pp. 213–214.

* cited by examiner

Primary Examiner—Mark R. Powell
Assistant Examiner—Thong Vu
(74) Attorney, Agent, or Firm—Bromberg & Sunstein LLP

(57) ABSTRACT

An apparatus for transmitting a set of documents from a server computer to a client computer utilizes a document list of document identifiers for automatically and repetitively transmitting selected documents from the server computer to the client computer. To that end, the apparatus first receives a first download request from the client computer. Once the request is received, then the document list is accessed to identify the identifier of a first document in the document list. Once identified, the first document and a controller are transmitted to the client computer. The controller controls the client computer to transmit a second download request to the server computer after a predetermined condition is satisfied. The predetermined condition may be the passing of a predetermined amount of time and the controller is a tag with in the first document.

60 Claims, 2 Drawing Sheets

APPARATUS AND METHOD FOR TRANSMITTING DOCUMENTS BETWEEN A SERVER COMPUTER AND A CLIENT COMPUTER

PRIORITY

This application claims priority from copending U.S. provisional patent application Ser. No. 60/074,920, filed Feb. 17, 1998, entitled "APPARATUS AND METHOD FOR TRANSMITTING DOCUMENTS BETWEEN A SERVER COMPUTER AND A CLIENT COMPUTER", the disclosure of which is incorporated herein, in its entirety, by reference.

FIELD OF THE INVENTION

This invention generally relates to data transmission networks and, more particularly, to transmitting data between a client computer and a server computer.

BACKGROUND OF THE INVENTION

The World Wide Web is a collection of server computers connected to the Internet that utilize the Hypertext Transfer Protocol ("HTTP"). HTTP is a known application protocol that provides users with access to documents (e.g., web pages) written in a standard mark-up page description language-known as Hypertext Markup Language ("HTML"). HTTP is used to transmit HTML web pages between a remote computer (e.g., a server) and a local computer in a form that is understandable to browser software (e.g., Netscape Navigator™, available from Netscape Communications Corporation of Mountain View, Calif.) executing on the local computer. A local computer ("client computer") "accesses" a web page by downloading the HTML code that makes up the web page. Once downloaded, the browser software interprets the HTML within the page, and displays a graphical representation of the page (defined by the HTML code) upon a client-side display device.

Like most software, browser software and server software typically are tested prior to distribution. Currently, browser and server software often are tested by manually downloading many web pages onto a client computer in a repetitive fashion. It is not uncommon for a single page to be downloaded several hundred times for such testing purposes. In a similar manner, computer graphical subsystems (e.g., the INTENSE 3D® graphics accelerator, available from Intergraph Corporation of Huntsville, Ala.) commonly are tested by manually and repetitively downloading graphics intensive web pages. Both testing processes require that a person manually download each of the required pages, however, thus increasing the ultimate cost of the product being tested.

SUMMARY OF THE INVENTION

In accordance with one aspect of the invention, an apparatus for transmitting a set of documents from a server computer to a client computer utilizes a document list of document identifiers for automatically and repetitively transmitting selected documents from the server computer to the client computer. To that end, the apparatus first receives a first download request from the client computer. Once the request is received, then the document list is accessed to identify the identifier of a first document in the document list. Once identified, the first document and a controller are transmitted to the client computer. The controller controls the client computer to transmit a second download request to the server computer after a predetermined condition is satisfied. In some embodiments, the predetermined condition is the passing of a predetermined amount of time and the controller is a tag within the first document.

In accordance with other aspects of the invention, in response to receipt of the second download request, the server again accesses the document list to identify the identifier of a second document in the document list. Once identified, the second document is transmitted to the client computer. In preferred embodiments, the document list is stored in memory of the server computer, and includes a plurality of sublists that are directed to documents having at least one preselected attribute (e.g., the existence of graphical images in the document). In additional embodiments, an information displayer also is transmitted to the client computer after the identifier of the first document is identified. The information displayer controls the client computer to display information relating to each of the documents received by the client computer.

In accordance with another aspect of the invention, the document is a World Wide Web page and the server is a World Wide Web server. In such case, the identifier is a uniform resource locator.

In accordance with still another aspect of the invention, an apparatus and method of transmitting a set of documents from a server to a client computer utilizes a selector that, in response to receipt of a download request message, selects one of the set of documents based upon information not in the download request. For example, the download request message may include a request to download the selector itself, or it may be a message that merely requests that the selector provide transmit any document (i.e., one of the documents in the set of documents). Accordingly, in preferred embodiments, the download message includes no address information identifying the selected document to be transmitted.

In still other aspects of the invention, the apparatus is a computer program product for use on a computer system. The computer program product includes a computer usable medium having computer readable program code thereon.

BRIEF DESCRIPTION OF THE DRAWINGS

The foregoing and advantages of the invention will be appreciated more fully from the following further description thereof with reference to the accompanying drawings wherein.

DETAILED DESCRIPTION OF PREFERRED EMBODIMENTS

Figure 1:
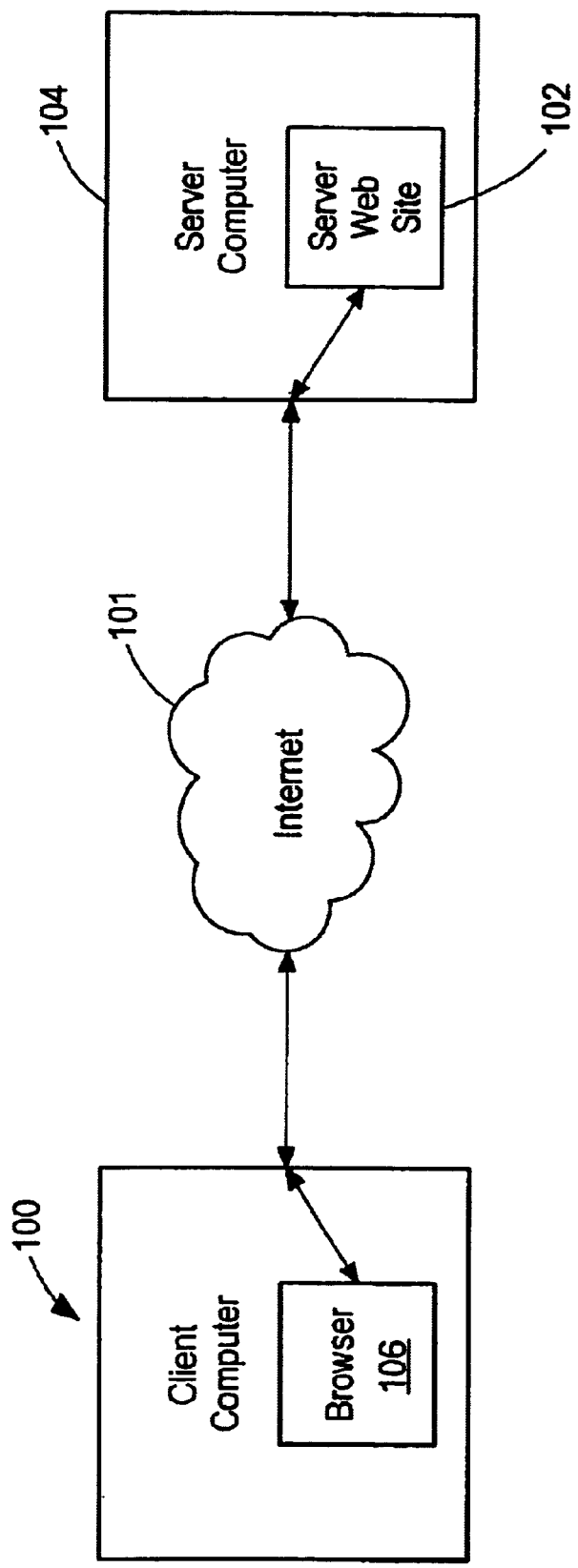
FIG. 1 schematically shows a commonly used network arrangement in which a client computer system may communicate with a network site via the Internet.

FIG. 1 schematically shows a commonly used network arrangement in which a (local) client computer system 100 may communicate with a network site via the Internet 101. When utilized with a preferred embodiment of the invention, the network site is a World Wide Web site ("web site 102") on a server computer system 104 that may be accessed by browser software 106 on the client computer system 100. The web site 102 preferably includes server software, and one or more web pages that may be downloaded by the browser 106 onto the client computer 100.

Figure 2:
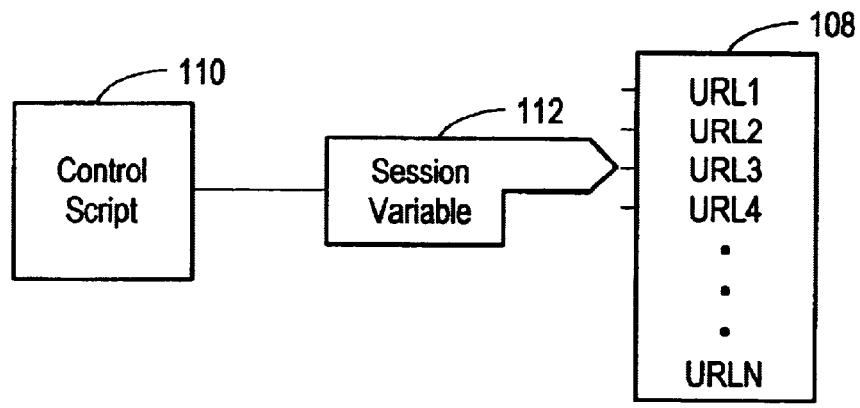
FIG. 2 shows a preferred embodiment of the invention in which a control script maintains the state of a document list.

In accordance with a preferred embodiment of the invention, selected web pages at the web site 102 are serially and automatically downloaded onto the client computer 100. To that end, the HTML code of each of the selected web pages first is modified to include a controller such as, for example, a "META-REFRESH" tag (see below). As discussed in greater detail below, the controller causes the client computer 100 to issue a subsequent download request to the server 104 for another network document (i.e., a web page). Once modified to include the controller, the uniform resource locator ("URU") of each such modified web page is added to a document list 108. FIG. 2 shows one embodiment of such a document list 108 having "N" web pages. Each of the web pages identified in the document list 108 is transmitted to the client computer 100 by means of a control script 110 (i.e., a software program on the server computer 104). As discussed in greater detail below, the control script 110 preferably utilizes a session variable 112 to determine the order in which each of the selected web pages in the document list 108 are to be transmitted to the client computer 100.

Figure 3:
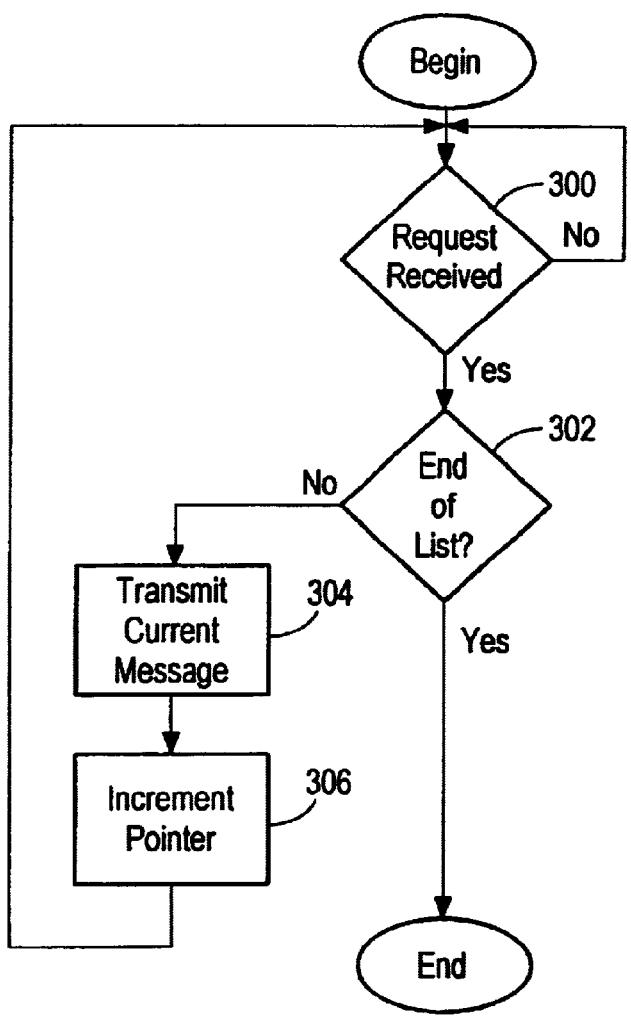
FIG. 3 shows a preferred process utilized by a server computer for automatically uploading web pages to the client computer.

FIG. 3 shows a preferred process utilized by the server computer 104 for automatically uploading web pages from the server computer 104 to the client computer 100. It should be noted that the entire apparatus for performing such process preferably is located on the server computer 104. Accordingly, the client computer 100 requires no specialized software or other apparatus to perform the process. In alternative embodiments, the apparatus may be located remotely from the server computer 104.

The process begins at step 300 in which it is determined if a download request from the client computer 100 is received by the server computer 104. For reasons discussed in detail below, the download request preferably is a request to download the control script 110. Although not downloaded, the control script 110 performs a number of functions (noted below) upon receipt of the download request.

The first download request from the client computer 100 may be initiated in accord with many methods. For example, in preferred embodiments, the client computer 100 may download a home web page (from the server computer 104) having a graphical user interface ("GUI") for initiating the request. The GUI may include a button having indicia such as "LAUNCH TEST" that, when selected, designates the control script 110 as the target web page to be downloaded. Once selected, a series of configuration menus may be displayed. In preferred embodiments, a "WEB PAGE TYPE" configuration menu may enable a user to select one or more of several types of web pages to download. Among those types of web pages are those with certain types of detailed graphical indicia, or those with plain text. Additional types of web pages also may be those having portions within the HTML code that are written in certain languages (e.g., JAVASCRIPT or PERL), or those having multimedia applications. A user may select the type of web page to download based upon the product being tested. For example, if testing a graphics subsystem, web pages with detailed graphical indicia may be selected. Conversely, if testing a network connection, web pages with plain text may be selected.

Accordingly, the first download request preferably is generated by selecting the "LAUNCH TEST" button, or in response to a call produced by a controller (e.g., a META-REFRESH tag) within a displayed page. In other embodiments, the first download request may be generated by a JAVA applet or other program.

Once the request is received, the process continues to step 302 in which the control script 110 determines if the session variable 112 is pointing to the end of the document list 108. In preferred embodiments, the session variable 112 is included in the Microsoft INFORMATION SERVER™ server software, version 3.0, available from Microsoft Corp of Redmond, Wash. The INFORMATION SERVER™ server software typically is utilized with the Microsoft NT™ operating system, also available from Microsoft Corp. The control script 110 is programmed to manipulate the session variable 112 to point to the URL of a web page (in the list 108) that is to be transmitted to the client computer 100 (i.e., the "current URL" or "current page"). Although a session variable 112 is discussed, however, it should be noted that other methods of determining the current URL in the document list 108 may be utilized. For example, the control script 110 may be written to include its own pointer. In other embodiments, the current URL may be maintained in a database or in a text file.

The control script 110 preferably is written in ACTIVE SERVER PAGE® language ("ASP"). In alternative embodiments, the control script 110 is written in PERL or JAVASCRIPT. Other known programming languages may be utilized in lieu of those mentioned.

The process ends if it is determined at step 302 that the end of the list 108 has been reached. Conversely, if it is determined at step 302 that the end of the list 108 has not been reached, then the process continues to step 304 in which the current page (i.e., the current page and its associated controller) is transmitted to the client computer 100. Once the current page is transmitted, the process continues to step 306 in which the session variable 112 (i.e., the pointer) is incremented to the next URL in the list 108. The process then loops back to step 300 in which the server computer 104 waits to receive another download request from the client computer 100.

Preferred embodiments are not intended to be limited to a list as shown in FIG. 2. Other methods of utilizing a set of documents in the described manner may be employed. For example, documents may be dynamically modified and added to the set of documents, and then transmitted to the client computer 100.

As noted above, the HTML code of each web page to be transmitted to the client computer 100 is modified to include a controller, such as the META REFRESH tag, that causes the client computer 100 to transmit a subsequent download request to the server computer 104 after the web page is downloaded. Accordingly, each web page transmitted to the client computer 100 preferably is modified. Absent such modification, preferred embodiments will not operate as desired. For more information on the META REFRESH tag, as well as other HTML tags, see, for example, the "HTML 4.0 Specification W3C Working Draft, Sep. 17, 1997" at http://www.w3.org VWD-html40/html40.txt).

As is known in the art, the META REFRESH tag includes both a time variable and a target variable, and is located in the header portion of a web page. The time variable in each web page (preferably set by a preconfiguration utility) determines the total amount of time that the web page is to be displayed by the client computer 100. The target variable in each page (also preferably set by a configuration utility) designates the web page or other document that is to be called upon expiration of the total amount of time designated by the time variable. In preferred embodiments, the target variable is set to the URL of the control script 110. As mentioned above, the control script 110 responds to a request from the client computer 100 at step 300 (FIG. 3) by transmitting the next web page in the document list 108 to the client computer 100 if the end of the document list 108 has not been reached.

The time variable in the META REFRESH tag maybe set according to the type of web page in which the tag is utilized. For example, the time variable may be set to a relatively long time if the web page includes extensive graphical indicia. Conversely, the time variable may be set to a relatively short time if the web page merely includes plain text and no extensive graphical indicia.

Of course, the browser software 106 on the client computer 100 must support the META REFRESH tag when such tag is used as a controller. Accordingly, in preferred embodiments, the browser software 106 may be either of INTERNET EXPLORER™, version 2.0 or higher, available from Microsoft Corp, or NETSCAPE NAVIGATOR™, version 2.0 or higher, available from Netscape Communications Corporation. Both noted browser programs are preferred since both support the META REFRESH tag (i.e., HTML specification 3.2).

In alternative embodiments, other types of controllers may be utilized in lieu of the META REFRESH tag. For example, a Java applet may be.utilized to perform the function of setting a time interval and initiating another request. The controller may be either a part of the HTML code of the transmitted web page, or an independent, freely operating program that may be executed by the browser 106, operating system, or other software executing on the client computer 100.

The document list 108 preferably is created by first determining which web pages are to be in the document list 108 for the client computer 100, and then modifying the HTML code in such web pages to include the META REFRESH tag. Web pages are selected to be in the list 108 based upon the groups of web pages selected by the user in the WEB PAGE TYPE configuration menu. In alternative embodiments, a client computer 100 having appropriate access rights to the server computer 104 may upload a web page to the document list 108. Such web page may be from any source such as, for example, another web server. Once uploaded to the server computer 104, such web page first is modified by the control script 110 to include the META REFRESH tag, and then added to the document list 108.

In other embodiments, an information displayer may be transmitted to the client computer 100 to display the results of the test in a results window on a display device coupled to the client computer 100. Such test results may include the number of pages accessed by the client computer 100, the time that each page is displayed by the display device, and the total amount of time that the test executed. The results window may be displayed when the "LAUNCH TEST" button is selected. The information in the results window may be updated any predetermined time interval such as, for example, every five seconds. In preferred embodiments, the information displayer is a web page that initially is transmitted to the client computer 100 with the home page. In a manner similar to the web pages being downloaded, the results window (web page) preferably includes a META REFRESH tag and thus, is periodically updated by the server 104.

The server computer 104 may simultaneously perform the document transmission process as shown in FIG. 3 with a plurality of client computers (not shown). In such case, the control script 110 simultaneously performs the process shown in FIG. 3 for each session that is being conducted with each of the plurality of client computers. More particularly, the control script 110 creates a separate document list 108 for each client session, and then increments the session variable 112 for each list 108, as necessary, to maintain the state of each session.

Preferred embodiments of the invention enable a client computer 100 to utilize two or more servers that each include a local control script 110. In particular, each server may include a GUI that initiates the process shown in FIG. 3. Once the end of the document list 108 on a first server computer 104 is reached, the document list 108 on a second server computer 104 may be accessed and traversed by the control script 110 that is local to the second server computer 104. This may be accomplished by setting the target variable in the META REFRESH tag in the last web page in the first server document list 108 to the control script 110 on the second server computer 104. In other embodiments, the target field in the META REFRESH tags of, transmitted web pages may be set to alternate between control scripts on different remote server computers 104.

It should be noted that although preferred embodiments of the invention have been described in terms of the World Wide Web, other embodiments of the invention may be practiced with other types of networks. Accordingly, the description of various embodiments of the invention in terms of the World Wide Web is not intended to limit the scope of the invention.

Preferred embodiments of the invention may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. An apparatus for transmitting a set of documents from a server computer to a client computer, the apparatus comprising:

an input that receives download request messages from the client computer;

a selector that, in response to receipt of a download request message, selects one of the set of documents based upon information not in the download request, the download request message including no address information identifying the selected one of the set of documents; and an output that forwards both a controller and the selected one of the set of documents to the client computer, when executing on the client computer, the controller commanding the client computer to generate and transmit a download request message to the server computer.

2. The apparatus as defined by claim 1 further comprising:

a document modifier that adds the controller to documents in the set of documents.

3. The apparatus as defined by claim 1 wherein the download request-messages request to download the selector.

4. The apparatus as defined by claim 1 wherein the set of documents includes no more than one document, the selector selecting the one document a preselected number of times.

5. The apparatus as defined by claim 1 wherein in response to receipt of a download request message, the selector determines if additional documents in the set are to be selected, the document selector not selecting any additional documents in the set if determined that additional documents are not to be selected.

6. The apparatus as defined by claim 1 wherein the controller is a tag incorporated into each document in the set of documents.

7. The apparatus as defined by claim 1 wherein the controller commands the client computer to generate and transmit a download request message to the server computer after a predetermined condition is satisfied.

8. The apparatus as defined by claim 1 wherein each document is identified by a document identifier, the apparatus further comprising:

memory that stores a list of the set of documents, the list having the document identifier of each document in the set of documents, the selector accessing the list to select the selected document.

9. The apparatus as defined by claim 1 wherein the controller is incorporated into at least one document in the set of documents.

10. The apparatus as defined by claim 1 wherein the server computer includes a retriever that retrieves the selected document for forwarding to the client computer.

11. The apparatus as defined by claim 10 wherein the retriever is server software.

12. The apparatus as defined by claim 1 wherein the selector is a control script.

13. The apparatus as defined by claim 1 wherein the selector executes on the server computer.

14. The apparatus as defined by claim 1 wherein the one of the set of documents is selected based upon a pointer that points to the one of the set of documents.

15. The apparatus as defined by claim 1 wherein the download request message is forwarded to the selector by the server computer.

16. The apparatus as defined by claim 1 wherein the selected one of the set of documents is a web page that, after being forwarded to the client computer, is interpreted and graphically displayed upon a client-side display device.

17. A computer program product for use on a computer system for transmitting a set of documents from a server computer to a client computer, the computer program product comprising a computer usable medium having computer readable program code thereon, the computer readable program code comprising:

program code for receiving download request messages from the client computer;

program code that, in response to receipt of a download request message, selects one of the set of documents based upon information not in the download request, the download request message including no address information identifying the selected one of the set of documents; and program code for forwarding both a controller and the selected one of the set of documents to the client computer, when executing on the client computer, the controller commanding the client computer to generate and transmit a download request message to the server computer.

18. The computer program product as defined by claim 17 further comprising:

program code for adding the controller to documents in the set of documents.

19. The computer program product as defined by claim 17 wherein the download request messages request to download the selector.

20. The computer program product as defined by claim 17 wherein the controller is incorporated into at least one document in the set of documents.

21. The computer program product as defined by claim 17 wherein the server computer includes program code for retrieving the selected document for forwarding to the client computer.

22. The computer program product as defined by claim 21 wherein the program code for retrieving is server software.

23. The computer program product as defined by claim 17 wherein the program code for selecting is a control script.

24. The computer program product as defined by claim 17 wherein the program code for selecting executes on the server computer.

25. The computer program product as defined by claim 17 wherein the one of the set of documents is selected based upon a pointer that points to the one of the set of documents.

26. The computer program defined by claim 17 wherein the selected one of the set of documents is a web page that, after being forwarded to the client computer, is interpreted and graphically displayed upon a client-side display device.

27. An apparatus for transmitting a set of documents from a server computer to a client computer, each document having a controller that commands the client computer to generate and transmit a download request message, the server having server software for retrieving documents on the server computer, the apparatus comprising:

an input that receives download request messages from the client computer;

a selector that, in response to receipt of a download request message, selects one of the set of documents and commands the server software to retrieve the selected one of the set of documents, the download request message including no address information identifying the selected one of the set of documents; and an output that forwards the selected one of the set of documents to the client computer.

28. The apparatus as defined by claim 27 further comprising:
a document modifier that adds the controller to documents in the set of documents.

29. The apparatus as defined by claim 27 wherein each download message is a request to download the selector.

30. The apparatus as defined by claim 27 wherein the selected one of the set of documents is a web page that, after being forwarded to the client computer, is interpreted and graphically displayed upon a client-side display device.

31. A method of transmitting a set of documents from a server computer to a client computer, each document in the set of documents being identified by an identifier in a document list, the method comprising:
receiving a first download request from the client computer;
accessing, in response to receiving the first download request, the document list to identify the identifier of a first document in the document list, the first download request including no address information identifying the first document; and
transmitting the first document and a controller to the client computer after the identifier of the first document is identified, the controller commanding the client computer to transmit a second download request to the server computer after a predetermined condition is satisfied.

32. The method as defined by claim 31 further including:
receiving the second download request from the client computer;
accessing, in response to receiving the second download request, the document list to identify the identifier of a second document in the document list;
transmitting the second document to the client computer after the identifier of the second document is identified.

33. The method as defined by claim 31 wherein the controller is a tag within the first document.

34. The method as defined by claim 31 wherein the predetermined condition is the passing of a predetermined amount of time.

35. The method as defined by claim 31 wherein the document list includes a plurality of sublists, each sublist being directed to documents having at least one preselected common attribute.

36. The method as defined by claim 31 further comprising:
transmitting an information displayer to the client computer after the identifier of the first document is identified, the information displayer controlling the client computer to display information relating to each of the set of documents received by the client computer.

37. The method as defined by claim 31 wherein the document is a World Wide Web page and the server computer includes a World Wide Web server.

38. The method as defined by claim 31 further comprising:
accessing a pointer that points to the identifier of the first document; and
moving the pointer to point to another document in the list.

39. The method as defined by claim 31 further comprising:
adding a new document identifier identifying a new document to the document list, the new document being in the set of documents after the new document identifier is added to the document list.

40. The method as defined by claim 31 wherein the first document is a web page that, after being transmitted to the client computer, is interpreted and graphically displayed upon a client-side display device.

41. An apparatus for transmitting a set of documents from a server computer to a client computer, each document in the set of documents being identified by an identifier in a document list, the apparatus comprising:
a receiver for receiving a first download request from the client computer;
means for accessing, in response to receiving the first download request, the document list to identify the identifier of a first document in the document list, the first download request including no address information identifying the first document; and
means for causing the server computer to transmit the first document and a controller to the client computer after the identifier of the first document is identified, the controller controlling the client computer to transmit a second download request to the server computer after a predetermined condition is satisfied.

42. The apparatus as defined by claim 41 further including:
means for receiving the second download request from the client computer;
means for accessing, in response to receiving the second download request, the document list to identify the identifier of a second document in the document list; and
means for causing the server computer to transmit the second document to the client computer after the identifier of the second document is identified.

43. The apparatus as defined by claim 41 wherein the controller is a tag within the first document.

44. The apparatus as defined by claim 41 wherein the document list includes a plurality of sublists, each sublist being directed to documents having at least one preselected common attribute.

45. The apparatus as defined by claim 41 further comprising:
means for causing the server computer to transmit an information displayer to the client computer after the identifier of the first document is identified, the information displayer controlling the client computer to display information relating to each of the set of documents received by the client computer.

46. The apparatus as defined by claim 41 further including:
a pointer that points to the identifier of the first document; and
an incrementer that moves the pointer to point to another document in the list.

47. The apparatus as defined by claim 41 further including:
means for adding a new document identifier identifying a new document to the document list, the new document being in the set of documents after the new document identifier is added to the document list.

48. The apparatus as defined by claim 41 wherein the first document is a web page that, after being transmitted to the client computer, is interpreted and graphically displayed upon a client-side display device.

49. A computer program product for use on a computer system for transmitting a set of documents from a server computer to a client computer, each document in the set of documents being identified by an identifier in a document list, the computer program product comprising a computer usable medium having computer readable program code thereon, the computer readable program code including:

program code for receiving a first download request from the client computer;

program code for accessing, in response to receiving the first download request, the document list to identify the identifier of a first document in the document list, the first download request including no address information identifying the first document; and program code for causing the server computer to transmit the first document and a controller to the client computer after the identifier of the first document is identified, the controller controlling the client computer to transmit a second download request to the server computer after a predetermined condition is satisfied.

50. The computer program product as defined by claim 49 further including:

program code for receiving the second download request from the client computer;

program code for accessing, in response to receiving the second download request, the document list to identify the identifier of a second document in the document list; and program code for causing the server computer to transmit the second document to the client computer after the identifier of the second document is identified.

51. The computer program product as defined by claim 49 wherein the controller is a tag within the first document.

52. The computer program product as defined by claim 49 wherein the predetermined condition is the passing of a predetermined amount of time.

53. The computer program product as defined by claim 49 wherein the document list includes a plurality of sublists, each sublist being directed to documents having at least one preselected common attribute.

54. The computer program product as defined by claim 49 further comprising:

program code, for causing the server computer to transmit an information displayer to the client computer after the identifier of the first document is identified, the information displayer controlling the client computer to display information relating to each of the set of documents received by the client computer.

55. The computer program product as defined by claim 49 wherein the document is a World Wide Web page and the server computer includes a World Wide Web server.

56. The computer program product as defined by claim 49 further including:

program code for accessing a pointer to the list that points to the identifier of the first document; and program code for moving the pointer to point to another document in the list.

57. The computer program product as defined by claim 49 further including:

program code for adding a new document identifier identifying a new document to the document list, the new document being in the set of documents after the new document identifier is added to the document list.

58. The computer program as defined by claim 49 wherein the first document is a web page that, after being transmitted to the client computer, is interpreted and graphically displayed upon a client-side display device.

59. An apparatus for transmitting a set of documents from a server computer to a client computer, the apparatus comprising:

a document list having at least one identifier, each identifier in the list identifying one of the set of documents; and a list manager to receive a download request originating from the client computer and responsively access the list to identify a first identifier, the list manager controlling the server computer to transmit a copy of the document identified by the first identifier to the client computer, the download request message including no address information identifying the document, the list manager transmitting a controller to the client computer in response to receipt of the download request, the controller controlling the client computer to transmit a second download request to the server computer after a predetermined condition is satisfied.

60. The apparatus as defined by claim 59 wherein the document is a web page that, after being forwarded to the client computer, is interpreted and graphically displayed upon a client-side display device.

* * * * *